(12) United States Patent
Wei et al.

(10) Patent No.: US 7,882,177 B2
(45) Date of Patent: Feb. 1, 2011

(54) EMPLOYING PIXEL DENSITY TO DETECT A SPAM IMAGE

(75) Inventors: Ke Wei, San Mateo, CA (US); Hao Zheng, Saratoga, CA (US); Jay Pujara, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 769 days.

(21) Appl. No.: 11/834,529

(22) Filed: Aug. 6, 2007

(65) Prior Publication Data

US 2009/0043853 A1 Feb. 12, 2009

(51) Int. Cl.
*G06K 9/60* (2006.01)

(52) U.S. Cl. .................. 709/204; 382/199; 382/190; 382/237

(58) Field of Classification Search .......... 709/202
See application file for complete search history.

(56) References Cited

U.S. PATENT DOCUMENTS

| | | | | |
|---|---|---|---|---|
| 6,094,508 | A * | 7/2000 | Acharya et al. | 382/199 |
| 6,701,009 | B1 * | 3/2004 | Makoto et al. | 382/164 |
| 6,987,876 | B2 * | 1/2006 | Silber et al. | 382/152 |
| 7,003,174 | B2 * | 2/2006 | Kryukov et al. | 382/266 |
| 7,293,063 | B1 * | 11/2007 | Sobel | 709/206 |
| 7,373,385 | B2 | 5/2008 | Prakash | |
| 7,665,131 | B2 * | 2/2010 | Goodman et al. | 726/13 |
| 2004/0036923 | A1 * | 2/2004 | Kokemohr et al. | 358/3.27 |
| 2004/0075744 | A1 * | 4/2004 | Newman | 348/207.1 |
| 2004/0218804 | A1 * | 11/2004 | Affleck et al. | 382/141 |
| 2005/0135670 | A1 * | 6/2005 | Vaidyanathan | 382/154 |
| 2006/0093998 | A1 * | 5/2006 | Vertegaal | 434/236 |
| 2006/0251322 | A1 * | 11/2006 | Palum et al. | 382/167 |
| 2006/0274210 | A1 * | 12/2006 | Kim | 348/624 |
| 2007/0030396 | A1 * | 2/2007 | Zhou et al. | 348/700 |
| 2007/0253040 | A1 * | 11/2007 | Lee et al. | 358/518 |
| 2007/0280551 | A1 * | 12/2007 | Oztan et al. | 382/268 |
| 2008/0091765 | A1 * | 4/2008 | Gammage et al. | 709/202 |
| 2008/0140781 | A1 * | 6/2008 | Bocharov et al. | 709/206 |
| 2009/0043853 | A1 * | 2/2009 | Wei et al. | 709/206 |
| 2009/0113003 | A1 * | 4/2009 | Lu et al. | 709/206 |

OTHER PUBLICATIONS

"Sobel Edge Detection Method for Matlab", p. 3.*
"Data sheet for Sobel Edge Detection Core", p. 1.*

(Continued)

*Primary Examiner*—Ashok B Patel
*Assistant Examiner*—Andrew Goldberg
(74) *Attorney, Agent, or Firm*—Frommer Lawrence & Haug LLP; Jamie L. Wiegand (57) ABSTRACT

A network device and method are directed towards detecting and blocking image spam within a message by performing statistical analysis on differences in edge pixel distribution patterns. An image spam detection component receives a message with an image attachment. Physical characteristics of the image are examined to determine whether the image is a candidate for further analysis. If so, then the image may be converted to a grayscale image, and then performing edge detection, followed by the elimination of non-maxima and thresholding of weak edges. Edge pixels and then employed to determine a normalized pixel density distribution (PDD). Various statistical analyses are applied to the resulting normalized PDD to determine a likelihood that the image is spam. A signature based exemption may be applied to images improperly identified as spam, based on trusted user feedback.

19 Claims, 9 Drawing Sheets

OTHER PUBLICATIONS

Boucher, Alain—Publications, 3 pgs., http://www.ifi.auf.org/personnel/Alain.Boucher/publis/ (accessed Oct. 23, 2007).

"Edge Detection," Wikipedia, the free encyclopedia, 5 pgs., http://en.wikipedia.org/w/index.php?title=Edge_detection&printable=yes (accessed Oct. 15, 2007).

Ke, Yan et al., "Efficient Near-duplicate Detection and Sub-image Retrieval," 8 pgs., Oct. 2004, Carnegie Mellon University.

Tran, H. et al., "A novel approach for text detection in images using structural features," 10 pgs.

"Sobel Edge Detector," 7 pgs., http://homepages.inf.ed.ac.uk/rbf/HIPR2/sobel.htm (accessed Oct. 23, 2007).

Pietikainen, Matti et al., "Edge-Based Method for Text Detection from Complex Document Images," 6 pgs., University of Oulu, Finland.

* cited by examiner

TRADING ALERT!
WE SEE A RUN STARTING TO HAPPEN.
IT'S JUST BEGINING OF 1 WEEK PROMOTION!

Trade Date:        Monday, November 20, 2006
Comany:            PRG Group Inc.
Symbol:            PRGJ
Opening Price:     $1.33 UP $0.19 (17%) on Friday
For NOW:           $1.80 UP $0.46 (35%) Today
3-Day Target:      ! $5
Rating:            10/10
Recommendation:    STRONG BUY We want to congratulate all of our members who
read our PRGJ Trading Alert on Friday. We think
the fun is just begginning with this stock. Do not
wait until it is too late!!! Remember this is a
STRONG BUY RECOMMENDATION...

102

*TORA* *TORA* *TORA* *TORA*

Company Name:   TORA TECHNOLOGIES (OTC BB: TORA.OB)
Symbol:         TORA
Price:          $0.94 (UP Over 20% This Week!)
5-day Target:   $4
Current Market: Very Bullish
Recomendation:  Strong Buy

TORA RELEASES BREAKING NEWS:

--> TORA TECHNOLOGIES INC Files SEC form 10QSB, Quarterly Report
--> Beacon Equity Research: New Report On Online Cosmetic Industry Released

TORA IS GOING OFF THE CHAIN!
IT WILL POST IMMENSE PROFITS NEXT WEEK!
WATCH TORA TRADE ON MONDAY NOV 20TH!!

Disclaimer: Information withing this email contains "forward looking statements" withing the meaning of Section 27a of the Securities act of 1933 and Section 21B of the Securities exchange act of 1934. The Publisher of this report was compensated by an unrelated third party twenty five thousand dollars for distribution of this report.

EMPLOYING PIXEL DENSITY TO DETECT A SPAM IMAGE

TECHNICAL FIELD

The present invention relates generally to computing security, and more particularly but not exclusively to detecting and blocking image spam within a message.

BACKGROUND

The problem of spam in established communication technologies, such as electronic mail, is well-recognized. Spam may include unsolicited messages sent by a computer over a network to a large number of recipients. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular domain to exhaust its resources.

One type of spam message includes image spam. Image spam employs a technique in which the sender (typically a spammer) might include the spam as part of an embedded file attachment rather than in the body of the message. Image spam may include an image file, such as a GIF file, or the like, typically a quantity of random words, sometimes known as word salad, and maybe even a link to a website. An image spammer may use a combination and/or variation of these components to bypass traditional anti-spam technologies.

These images are often automatically displayed to a recipient of the message. Unfortunately, much of such image spam remains hidden or undetected as spam from today's spam filters. The increase in more complex image spam within messages has caused spam capture rates across the messaging security industry to decline, often resulting in wasted productivity and end-user frustration as more spam gets delivered.

Figure 1:
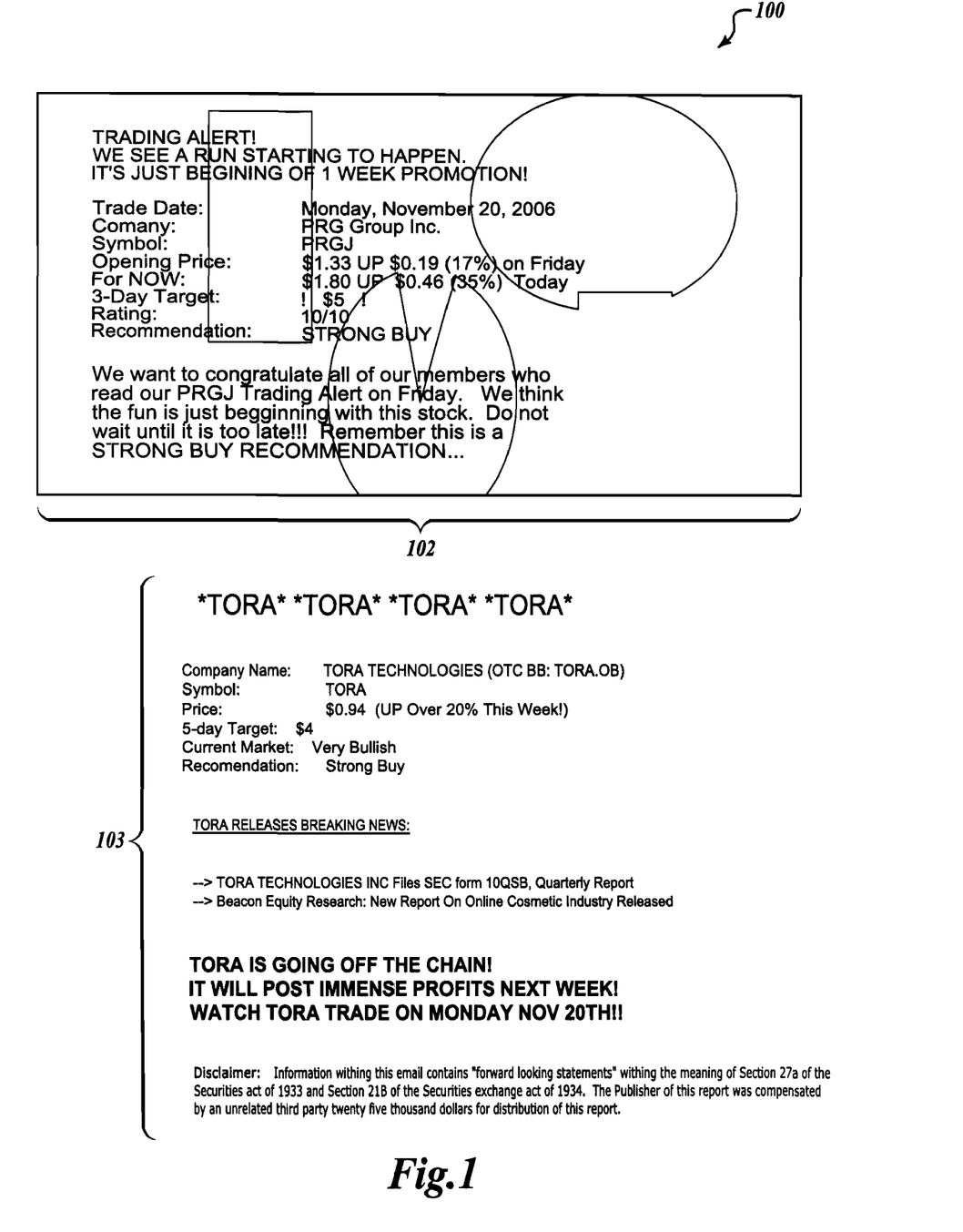
FIG. 1 shows examples of typical image spam that may be received within a message.

FIG. 1 illustrated examples of typical image spam 102-103. To an end-user recipient, the content of a message, image spam 102-103 might appear as a text-based message. Many spammers may use such image spam with links (e.g., URL links) embedded within the message or directly in the image spam, such as illustrated within image spam 103. One of the goals of the spammer is to have an end-user 'click' on the link, so that the end-user may be directed to a website that may be trying to sell something, phish for personal information, or even install spyware, mal-ware, or the like, on the end-user's computer.

Moreover, images can be gathered from remote locations using, for example, HTML IMG tags to display images loaded from a website when a message is viewed. Other variations of image spam may have embedded images that direct end-users to enter a URL address into a browser. Where there is no communication with any external source, this type of spam may evade URL block list type filters.

In addition, spammers often automatically generate image spam that may include virtually the same text, but appear as completely different images. For example, the spammers might change dimensions, spacing, or coloring of an image so that the image appears unique to traditional spam analysis. Spammers may employ a variety of image generation tools, for example, to randomize such characteristics while keeping substantially the same text.

To further confuse many of the traditional spam filters today, spammers may insert random characters and speckles, and even reuse an image to create a large number of slightly different images. Speckling allows the spammers, for example, to reuse a base image and add what looks like random bits of lint or speckles to the image, which often may appear to filters as unique images effectively evading fingerprinting, or other detection approaches. Another kind of image spam technique uses several colors making the text more difficult to recognize when using, for example, optical character recognition (OCR) techniques. Varying font colors may further hide spam type of words within an image. Recently, animated images and strip mining are techniques being used by image spammers to further evade traditional spam filters. Animated images with transparent frames are even sometimes used to build up spam images. Sometimes, an image spammer may even build an image spam from a plurality of distinct layers that may effectively evade traditional spam detection filters.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards detecting and blocking image spam within a message by performing statistical analysis on differences in edge pixel distribution patterns to detect text spam images. In one embodiment, a server having an image spam detection component receives a message with an image attachment. Physical characteristics of image attachment are initially examined to determine whether the image is a candidate for further analysis. If so, then the image may be converted to a grayscale image. By converting to a grayscale image edge detection may be performed, followed by, in one embodiment, elimination of non-maxima and thresholding of weak edges. Thresholding of weak edges may be performed, in one embodiment, by setting a pixel to black if its chrominance is below a defined threshold value. Edge pixels and then employed to determine a pixel density distribution (PDD). A normalized pixel density differential may then be determined from the PDD. Various statistical analyses may then be applied to the resulting normalized PDD to determine a likelihood that the image is spam. If the image is determined statistically to be spam, various actions may be performed to prevent the image from being sent to a destination, including blocking the message, expunging the message of the image, or the like.

The invention is not constrained however to statistically examining color thresholds for an image. For example, other characteristics of the image may also be employed, including, without limit, size data of the image, a single dimension of the image, or the like. Moreover, results for the various characteristics may be combined and statistically analyzed to detect whether the image is image spam.

In one embodiment, user feedback may be employed to identify images that may have been incorrectly identified as spam (e.g., false positives). Based, in part, on trusted user feedback, a signature based exemption may be applied such that the improperly identified image will be properly allowed when it is next received within a message.

Although the image spam detection mechanism may be implemented within a messaging server, the invention is not so limited. Thus, for example, in one embodiment, the image spam detection mechanism may also be implemented within a client device, integrated within a client messaging application, or the like.

Illustrative Environment

Figure 2:
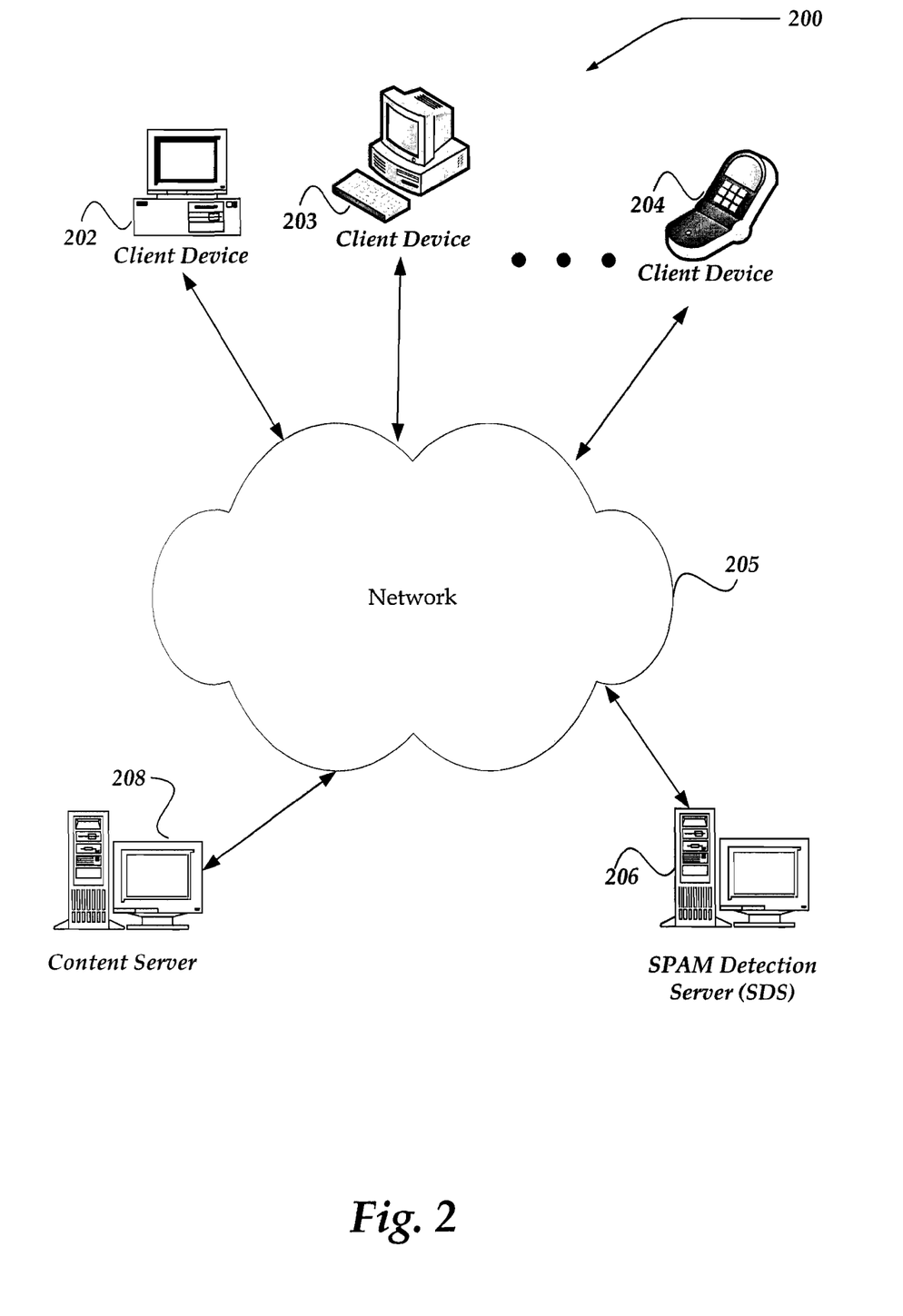
FIG. 2 shows a functional block diagram illustrating an environment for use in detecting image spam.

FIG. 2 is a functional block diagram illustrating an exemplary operating environment 200 in which the invention may be implemented. Operating environment 200 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 200 includes client devices 202-204, network 205, content server 208, and SPAM Detection Server (SDS) 206. Client devices 202-204 are in communication with each other, content server 208, and SDS 206 through network 205. Content server 208 and SDS 206 may also be in communication with each other through network 205.

One embodiment of a client device is described in more detail below in conjunction with FIG. 3. Briefly, however, client devices 202-204 may include virtually any computing device capable of receiving and sending a message over a network, such as network 205, to and from another computing device. The set of such devices described in one embodiment below generally includes computing devices that are usually considered more specialized devices with limited capabilities and typically connect using a wireless communications medium such as cell phones, smart phones, pagers, radio frequency (RF) devices, infrared (IR) devices, Citizen's-Band Radios (CBs), integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 202-204 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 202-204 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Client devices 202-204 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 205 is configured to couple client devices 202-204, with each other, and/or other network devices. Network 205 is enabled to employ any form of computer readable media for communicating information from one electronic device to another. In one embodiment, network 205 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 205 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, and future access networks may enable wide area coverage for network devices, such as client device 204, and the like, with various degrees of mobility. For example, network 205 may enable a radio connection through a radio network access such as Global System for Mobil communication (GSM), General Packet Radio Services (GPRS), Enhanced Data GSM Environment (EDGE), Code Division Multiple Access (CDMA), Wideband Code Division Multiple Access (WCDMA), or the like.

Furthermore, remote computers and other related electronic devices could be remotely connected to either LANs or WANs via a modem and temporary telephone link. In essence, network 205 includes any communication method by which information may travel between client devices 202-204, SDS 206, and/or content server 208.

Additionally, network 205 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Content server 208 includes virtually any network computing device that is configured to provide various resources, including content and/or services over network 205. Content server 208 may provide content and/or services for any of a variety of activities, including, but not limited to merchant businesses, financial businesses, insurance businesses, educational, governmental, medical, communication products, and/or services, or virtually any other site of interest. Many of such activities may communicate over the internet using a variety of mechanisms, including, but not limited to email, webpages, IM, SMS, or the like.

Content server 208 may include an interface that may request sensitive information from a user of client devices 202-204. For example, content server 208 may provide access to an account, which may request user log-in information. Such log-in information may include a user name, password, an entry of a key number, or the like. In another example, content server 208 may request other sensitive information, such as a credit card number, medical information, or the like. For example, content server 208 may operate as a merchant site that on at least one webpage of its website, there is a request for entry of sensitive information, including financial information, or the like. In one embodiment, a webpage may include a form, or virtually any other data entry mechanism. Moreover, content server 208 may instead, or in addition to requesting sensitive information from a user, provide one or more web pages that may be associated with an advertisement, blog, or the like, for which a content owner might seek to have a user of client devices 202-204 to be redirected towards. Thus, in at least one embodiment, content server 208 might represent a legitimate content service. However, in another embodiment, content server 208 might represent a phishing site, advertisement site, pornography site, gambling site, or the like. Therefore, in one embodiment, a message might be sent to one of client devices 202-204 that includes a link to a web page hosted within content server 208.

Devices that may operate as content server 208 include, but are not limited to personal computers, desktop computers, multiprocessor systems, microprocessor-based or programmable consumer electronics, network PCs, servers, network appliances, and the like.

One embodiment of SDS 206 is described in more detail below in conjunction with FIG. 4. Briefly, however, SDS 206 includes virtually any network device that is configured to receive a message and to statistically determine whether the message includes image spam. If the message does include image spam, based on the determination, SDS 206 may be configured and arranged to perform any of a variety of preventative actions. For example, SDS 206 may block the message from being sent towards its destination, expunge the message of the determined image spam and allow the message to be sent, provide an alert message to the destination, an Administrator, or the like. SDS 206 may employ a process substantially similar to that described below in conjunction with FIG. 5.

As illustrated, SDS 206 may include a message server that is configured to receive messages and route them to an appropriate client device, or the like. Thus, SDS 206 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, and the like. However, SDS 206 may also include a message server configured and arranged to manage other types of messages, including, but not limited to SMS, MMS, IM, or the like.

Although SDS 206 is illustrated as a distinct network device, the invention is not so limited. For example, a plurality of network devices may be configured to perform the operational aspects of SDS 206. For example, in one embodiment, the image spam diction may be performed within one or more network devices, while the message server aspects may be performed within one or more other network devices. In any event, devices that may operate as SDS 206 include, but are not limited to personal computers, desktop computers, multiprocessor systems, microprocessor-based or programmable consumer electronics, network PCs, servers, network appliances, and the like.

Illustrative Client Device

Figure 3:
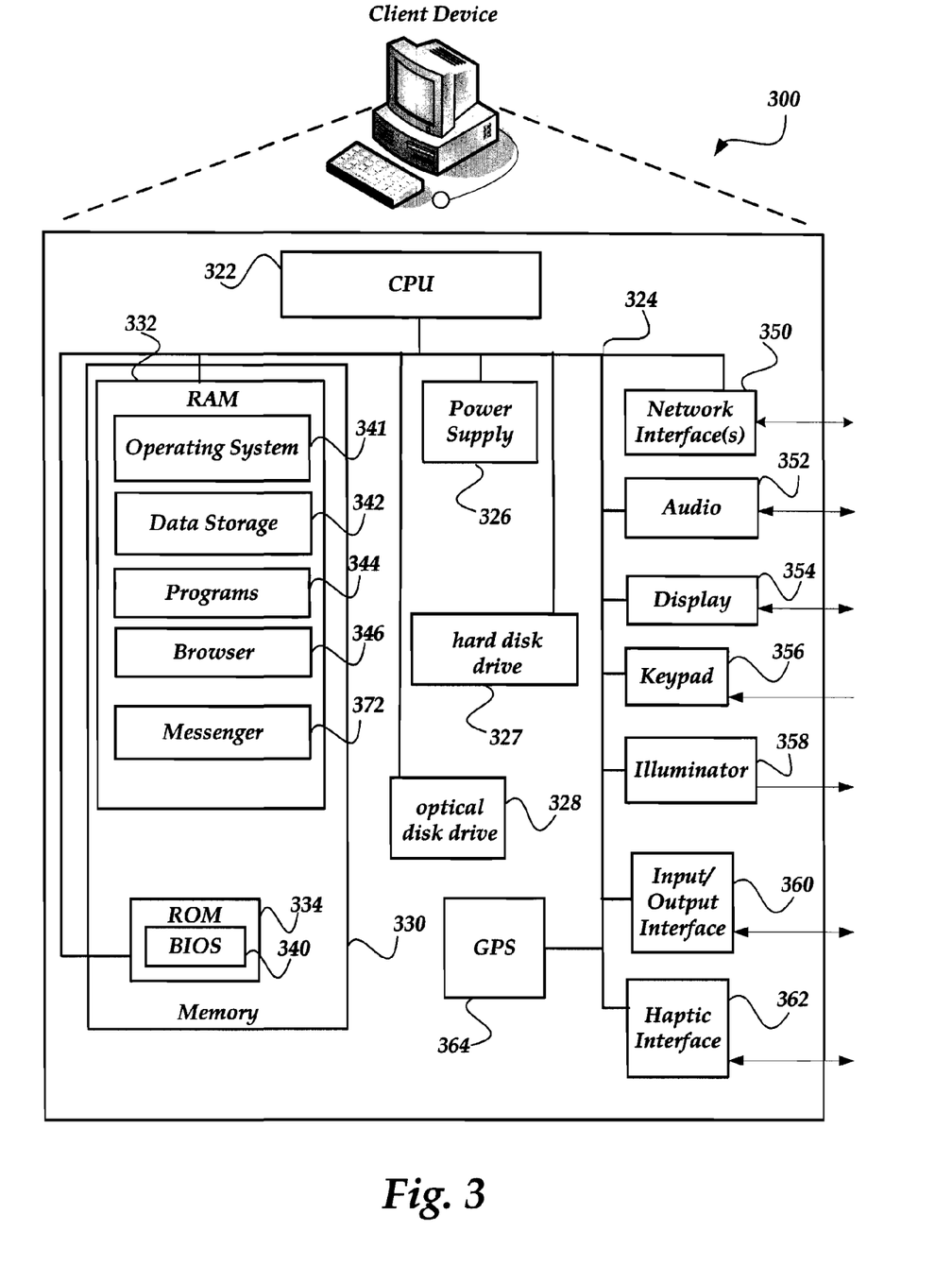
FIG. 3 shows one embodiment of a client device that may be employed within the environment illustrated in FIG. 2.

FIG. 3 shows one embodiment of client device 300 that may be included in a system implementing the invention. Client device 300 may represent one embodiment of client devices 202-204 of FIG. 2.

Client device 300 may include many more or less components than those shown in FIG. 3. However, the components shown are sufficient to disclose an illustrative embodiment for practicing the present invention. As shown in the figure, client device 300 includes a processing unit 322 in communication with a mass memory 330 via a bus 324.

Client device 300 also includes a power supply 326, one or more network interfaces 350, an optional audio interface 352, a display 354, a keypad 356, an illuminator 358, an input/output interface 360, an optional haptic interface 362, and an optional global positioning systems (GPS) receiver 364. Power supply 326 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 350 includes circuitry for coupling client device 300 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 352 is arranged to produce and receive audio signals such as the sound of a human voice, music, or the like. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Client device 300 may further include additional mass storage facilities such as optical disk drive 328 and hard disk drive 327. Hard disk drive 327 is utilized by client device 300 to store, among other things, application programs, databases, and the like. Additionally, optical disk drive 328 and hard disk drive 327, a flash memory, or the like may store cookies, data, images, or the like.

Keypad 356 may comprise any input device arranged to receive input from a user (e.g. a sender). For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Client device 300 also comprises input/output interface 360 for communicating with external devices, such as a headset, mouse, stylus, or other input or output devices. Input/output interface 360 can utilize one or more communication technologies, such as USB, infrared, Bluetooth™, and the like. Optional haptic interface 362 is arranged to provide tactile feedback to a user (e.g. a sender) of the client device. For example, the haptic interface may be employed to vibrate client device 300 in a particular way when another user of a computing device is calling.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS and the like, to further determine the physical location of client device 300 on the surface of the Earth. It is understood that under different conditions, GPS transceiver 364 can determine a physical location within millimeters for client device 300; and in other cases, the determined physical location may be less precise, such as within a meter or significantly greater distances.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 240 for controlling low-level operation of client device 300. The mass memory also stores an operating system 341 for controlling the operation of client device 300. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Memory 330 further includes one or more data storage 342, which can be utilized by client device 300 to store, among other things, programs 344 and/or other data. For example, data storage 342 may also be employed to store information that describes various capabilities of client device 300. The information may then be provided to another device based on any of a variety of events, including being sent as part of a header during a communication, sent upon request, and the like. Moreover data storage 342 may be used to store information such as data received over a network from another computing device, data output by a client application on client device 300, data input by a user of client device 300, or the like. For example, data storage 342 may include data, including cookies, and/or other client device data sent by a network device. Data storage 342 may also include image files, or the like, for display and/or use through various applications. Data storage 342 may also include received messages, attachments to messages, as well as messages to be sent to another computing device, or the like. Moreover, although data storage 342 is illustrated within memory 330, data storage 342 may also reside within other storage mediums, including, but not limited to optical disk drive 228, hard disk drive 327, or the like.

Programs 344 may also include computer executable instructions which, when executed by client device 300, transmit, receive, and/or otherwise process messages and enable telecommunication with another user of another client device. Other examples of application programs include calendars, contact managers, task managers, transcoders, database programs, word processing programs, security programs, spreadsheet programs, games, CODEC programs, and so forth. In addition, mass memory 330 stores browser 346, and messenger 372.

Browser 346 may be configured to receive and to send web pages, forms, web-based messages, and the like. Browser 346 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Messenger 372 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 372 may be configured as an IM application, such as AOL Instant Messenger, Yahoo! Messenger, .NET Messenger Server, ICQ, or the like. In one embodiment messenger 372 may be configured to include a mail user agent (MUA) such as Elm, Pine, MH, Outlook, Eudora, Mac Mail, Mozilla Thunderbird, or the like. In another embodiment, messenger 372 may be a client application that is configured to integrate and employ a variety of messaging protocols.

Illustrative Server Environment

Figure 4:
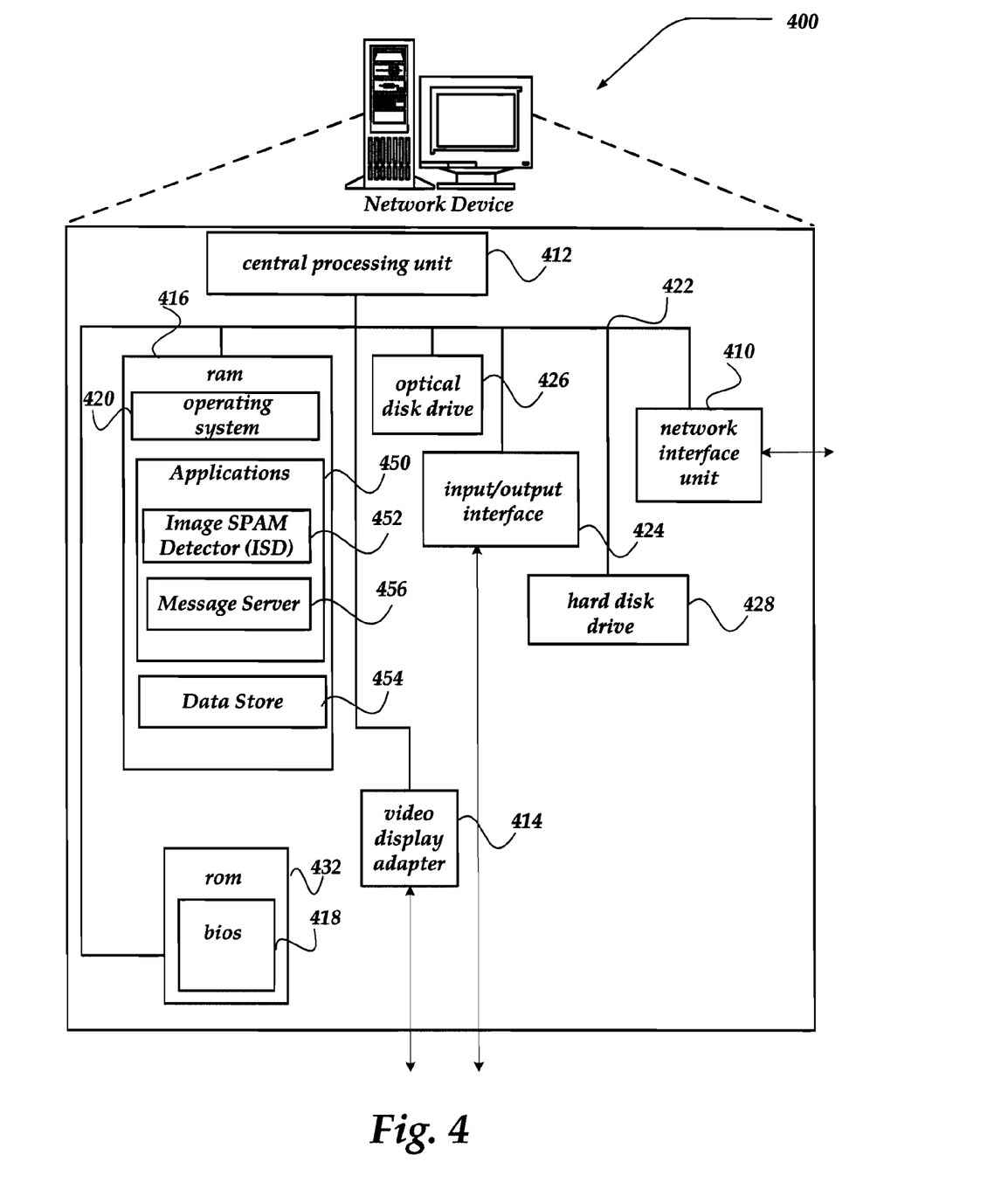
FIG. 4 shows one embodiment of a network device that may be employed to provide image spam detection.

FIG. 4 shows one embodiment of a network device, according to one embodiment of the invention. Network device 400 may include many more or less components than those shown. The components shown, however, are sufficient to disclose an illustrative embodiment for practicing the invention. Network device 400 may, for example, represent SDS 206 of FIG. 2.

Network device 400 includes processing unit 412, video display adapter 414, and a mass memory, all in communication with each other via bus 422. The memory generally includes RAM 416, and ROM 432. Network device 400 also includes one or more mass storage devices, such as hard disk drive 428, tape drive, optical disk drive, and/or floppy disk drive. The memory stores operating system 420 for controlling the operation of network device 400. Any general-purpose operating system may be employed. Basic input/output system ("BIOS") 418 is also provided for controlling the low-level operation of network device 400. As illustrated in FIG. 4, network device 400 also can communicate with the Internet, or some other communications network, via network interface unit 410, which is constructed for use with various communication protocols including the TCP/IP protocol. Network interface unit 410 is sometimes known as a transceiver, transceiving device, network interface card (NIC), or the like.

Network device 400 may also include an SMTP handler application for transmitting and receiving email. Network device 400 may also include an HTTP handler application for receiving and handing HTTP requests, and an HTTPS handler application for handling secure connections. The HTTPS handler application may initiate communication with an external application in a secure fashion.

Network device 400 also may include input/output interface 424 for communicating with external devices, such as a mouse, keyboard, scanner, or other input devices not shown in FIG. 4. Likewise, network device 400 may further include additional mass storage facilities such as optical disk drive 426 and hard disk drive 428. Hard disk drive 428 is utilized by network device 400 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 450 are loaded into memory and run on operating system 420. Examples of application programs include schedulers, calendars, transcoders, database programs, word processing programs, spreadsheet programs, security programs, web servers, and so forth. Mass storage may further include applications such message server 456, Image Spam Detector (ISD) 452, and data store 454.

Data store 454 is configured and arranged to store and otherwise manage messages, statistical data, images, or the like. Data store 454, however, is not limited to managing storage of these example items, and other items, data, information, or the like, may also be stored within data store 454, without departing from the scope of the invention. For example, data store 454 may also include user account information, policies, procedures or the like, useable for inhibiting delivery of image spam. Data store 454 may be implemented using a variety of technologies, including, but not limited to, folders, spreadsheets, data bases, scripts, applications, or the like.

Message server 454 may include virtually any computing component or components configured and arranged to forward messages from message user agents, and/or other message servers, or to deliver messages to a local message store, such as data store 454, or the like. Thus, message server 454 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 454 is not constrained to email messages, and other messaging protocols may also be managed by one or more components of message server 454. Thus, message server 454 may also be configured to manage SMS messages, IM, MMS, IRC, mIRC, or any of a variety of other message types. Moreover, message server 454 may further manage messages that may include one or more image files, links to image files, or the like.

ISD 456 is configured and arranged to operate in conjunction with message server 454 to detect and inhibit delivery of a message that is determined to include image spam. Thus, ISD 456 may either intercept a message to be delivered by message server 454, or receive a message from message server 454 to inspection. ISD 456 may then determine whether the message includes an image file. If so, ISD 456 may determine one or more characteristics of the image file, including, but not limited to an image file type, file size, image dimension, compression ratio employed on the image, or the like. Based, in part on the characteristics, ISD 456 may select to perform additional analysis upon the image file to determine statistically whether it is image spam. ISD 456 may employ a process such as described in more detail below in conjunction with FIG. 5 to perform at least some of its actions.

Generalized Operation

Figure 5:
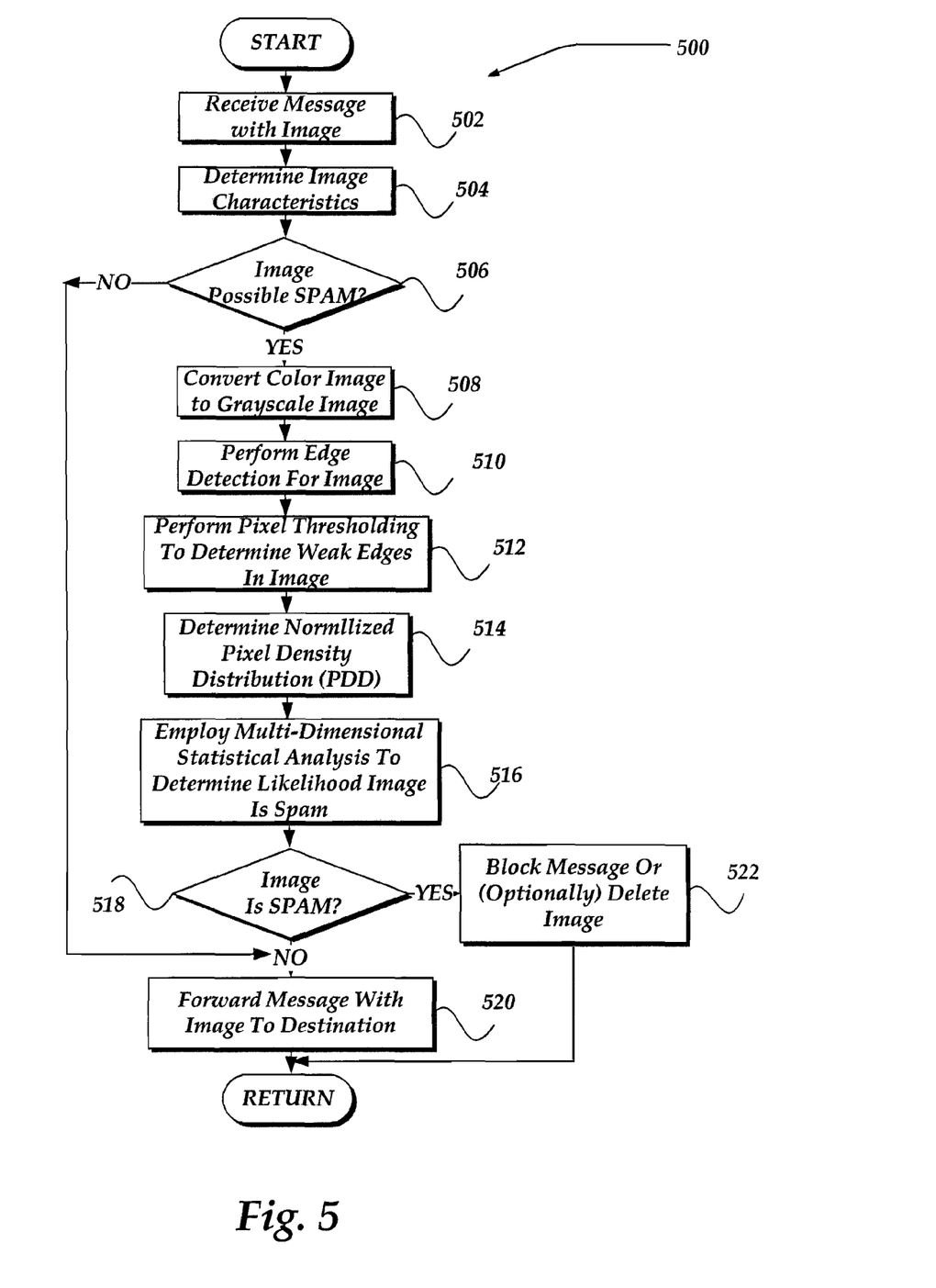
FIG. 5 illustrates a flow diagram generally showing one embodiment of an overview of process generally detecting image spam within a message.

The operation of certain aspects of the present invention will now be described with respect to FIG. 5. FIG. 5 illustrates a flow diagram generally showing one embodiment of an overview of process 500 generally useable in statistically detecting image spam within a message. Process 500 may be implemented within SDS 206 of FIG. 2, for example.

Process 500 may be configured to combine statistical analysis with run-time text detection within an image file.

Briefly, process 500 examines differences between spam image and normal (or non-spam) images by looking for a statistically significant amount of text within the image. It is assumed that image spam includes a significant amount of text over a normal image. Thus, text within an image tends to create more edges and a distribution of the edge pixels of text tends to be significantly different from non-spam images.

As illustrated, process 500 then, begins, after a start block, by receiving a message having an image file at block 502. At block 502, the image file is extracted for examination. At block 504, various characteristics of the image file may be determined, including, but not limited to the file type, file size, compression ratio, dimension (e.g., pixel size), or the like. In one embodiment, statistical analysis may appear to indicate, at least initially, that GIF type files tend to be employed for image spam over other types of files, including for example, PNG file types, PDF files types, JPEG file types, or the like.

In one embodiment, file size may be useable in initially determining whether an image file may be image spam. For example, statistical analysis may appear to initially indicate that image spam file sizes tend to fall into a range of file sizes between about 4 kb to about 40 kb, or so. Similarly, statistical analysis of known image spam appears to indicate currently that image spam file dimensions tend to appear within definable dimensional ranges, such as 200×200 pixel sizes, 300×800 pixel sizes, or the like. For example, in one embodiment, images with dimensions of 300×150, 860×260, or the like, may be determined to be candidates as possible image spam, without departing from the scope of the invention.

Thus, a possible image spam file may be selected for further analysis based on one or more of these characteristics. However, it is also known that such values, file types, or the like, may change over time. Thus, as part of process 500, additional analysis may be performed to adjust the values, file types, characteristics, or the like, that may be employed to initially select an image for additional analysis. For example, where analysis indicates that JPEG file types, or MMS file types, or the like, or being employed to communicate image spam, block 504 and decision block 506 may be adjusted. For example, where it is determined that a spammer has changed its strategy of using GIF files under a certain size and JPEG for files over another size, the invention can readily be modified to account for, and monitor for such changes in image spam patterns. Moreover, user feedback may be used to identify where the initial determination at blocks 504 and 506 is allowing an unacceptable amount of image spam through. Such feedback may then be used to assist in tuning the initial analysis steps. Moreover, periodic analysis may also be performed to determine whether a shift in image spam patterns is occurring.

For example, in one embodiment, user feedback may be used to identify that some image files are being identified improperly as image spam, or improperly as non-image spam.

Based, in part, on trusted user feedback, a signature based exemption may be applied such that the improperly identified image will be properly allowed when it is next received within a message.

For example, in one embodiment, a CRC8 32-bit signature, or the like, may be determined for identified image files. Then, when the file is seen again, an appropriate action may be taken based on the signature.

Similarly, where the dimensions, file sizes, or the like, appear to become different than initially determined, the invention may readily adjust for such changes. Moreover, any of a variety of other characteristics may also be employed to monitor and/or initially select images for additional analysis.

Moreover, it should be noted, that blocks 504 and 506 are directed to accelerating the process by reducing a number of images to be examined. The invention, however, is not constrained from examining each received image file, and thus, bypassing blocks 504 and 506 may be selected, without departing from the scope of the invention.

However, moving to decision block 506, an initial determination may be made based on various characteristics as described above. If, based on the initial determination, the image is to be examined further, processing flows to block 508; otherwise, processing branches to block 520.

At block 508, it has been observed that textures occurring in text images tend to be quite different from non-textual images, because the edges of the textual characters tend to be sharper, and their background intensity tends to change more gradually. Moreover, their gradient magnitudes tend to have higher values in edges of the characters, even when the text is embedded in pictures. In addition, the edges tend to be invariant with respect to the background variations, to image rotation, or similar image variations. Thus, process 500 seeks to examine edge information within the image. This may be achieved, in one embodiment, by examining the edges within a grayscale image. Thus, at block 508, the image may be converted to a grayscale image. However, it should be noted, that the invention is not limited to such conversion, and other mechanisms may be employed to examine the edges within the image, including for example, seeking to maximize edges through brightness mechanisms, or the like.

In any event, in one embodiment, converting of the image to grayscale may be performed by selecting a luminance component of a color model for which luminance and/or chrominance information may be uncorrelated, while ignoring chrominance components. One embodiment of an example how this might be performed is using a macro to do the conversion. For example, in one embodiment, the following definition might be used:

```
#define PixelIntensityToQuantum(pixel)((double)
    (V1*pixel[red]+V2*pixel[green]+V3*pixel
    [blue]+F)),
``` where V1, V2, V3, and F are selectable values.

In one embodiment, V1 may be selected to between about 0.2 to about 0.32, V2 may be selected between about 0.5 to about 0.64, V3 may be selected to be between about 0.9 and about 0.14, where V1+V2+V3 is one, and F=0.5. However, it should be clear that the invention is not constrained to these values, and others may be used, without departing from the scope of the invention. Moreover, in one embodiment, various implementations might employ a tool such as by ImageMagick Studio LLC. However, other tools may also be employed, including, for example, GD Graphics Library, an Open Source code library, or the like.

Processing then continues to block 510, where edge detection may be performed on the grayscale image. Any of a variety of mechanisms may be employed to detect the edges within the image. For example, in one embodiment, a Sobel operator may be applied to the grayscale image. In one embodiment, process 500 may be directed to examination of horizontal lines within the image, however the invention is not so constrained, and vertical lines, and/or a combination of horizontal and vertical lines may also be examined. In one embodiment, edge detection may be obtained for a pixel p[x][y] with Sobel Operator Gx (in the horizontal planes). After edge detection, the value of pixel p is:

$$P[x][y] = p[x-1][y-1]*Gx[0][0] + p[x][y-1]*Gx[1][0] +$$
$$p[x+1][y-1]*Gx[2][0] + p[x-1][y]*Gx[0][1] + p[x][y]*Gx[1][1] +$$
$$p[x+1][y]*Gx[2][1] + p[x-1][y+1]*Gx[0][2] +$$
$$p[x][y+1]*Gx[1][2] + p[x+1[y+1]*Gx[2][2]$$

Processing then flows to block 512, where thresholding may be performed to eliminate weak edges. While this may be achieved using any of a variety of mechanisms to distinguishing edges, one embodiment, employs a thresholding value for each pixel of between about 0.8 to about 0.95%, or so. If a chrominance associated with a given pixel is below the threshold value, the pixel is converted to a block pixel, thereby, strengthening edges within the image. Strengthening edges within an image, however, is not limited to this approach, and clearly other mechanisms may also be used to strengthen the image. Moreover, pixels falling below the threshold may also be converted to white, without departing from the scope of the invention. However, virtually any mechanism may be used to convert a contrast of a pixel within a determined weak edge to a higher contrast may be used to strengthen the edge.

Processing may then flow to block 514, where for each horizontal line, a number of edge pixels may be determined, and from which a normalized pixel density distribution (PDD) may be determined. In one embodiment, the normalized PDD may be determined using the following equation:

Normalized $PDD = \Sigma(Abs(f(x)-f(x-1))/width)/height$, where f(x) is a number of pixels in line x, and $0 \leqq x \leqq height$.

It should be noted, however, that the PDD is not constrained to being determined as described above, and a variety of other approaches may also be used. For example, in another embodiment:

Normalized $PDD = \Sigma((Abs(f(x)-f(x-1))/width))^2/height$.

Or in still anther embodiment:

Normalized $PDD = square(\Sigma(Abs(f(x)-f(x-1))/width))/height$,

In any event, processing continues next to block 516, where various features of the image may be combined and statistical methods may then be applied to quantify a likelihood that the image is image spam. For example, a decision tree, Naïve Bayesian, or the like, may be used to analyze the resulting PDDs to classify the image.

For some images, such as animated images, additional steps might be employed. For example, for animated images, each frame within the animated image may be analyzed, and the results may be used to obtain a sum for the deviations of each frame to determine an overall normalized PDD for the image.

Other variations may also be implemented within process 500 described above. For example, in one embodiment, blocks 508 and 510 might be combined. Thus, in one embodiment, after a grayscale transformation is performed, pixel values for the red, green, and blue may be the same. In this situation, one of the pixel types might be retained, such as the red value, for further processing.

Similarly, combining the black thresholding and deviation determinations with the edge detection may also be performed, without departing from the scope of the invention. Thus, in one embodiment, for each pixel, the Sobel Gx kernel may be applied, and then the result may be thresholded to determine whether to increase a counter which keeps a number of white dots for each horizontal line.

Figure 6:
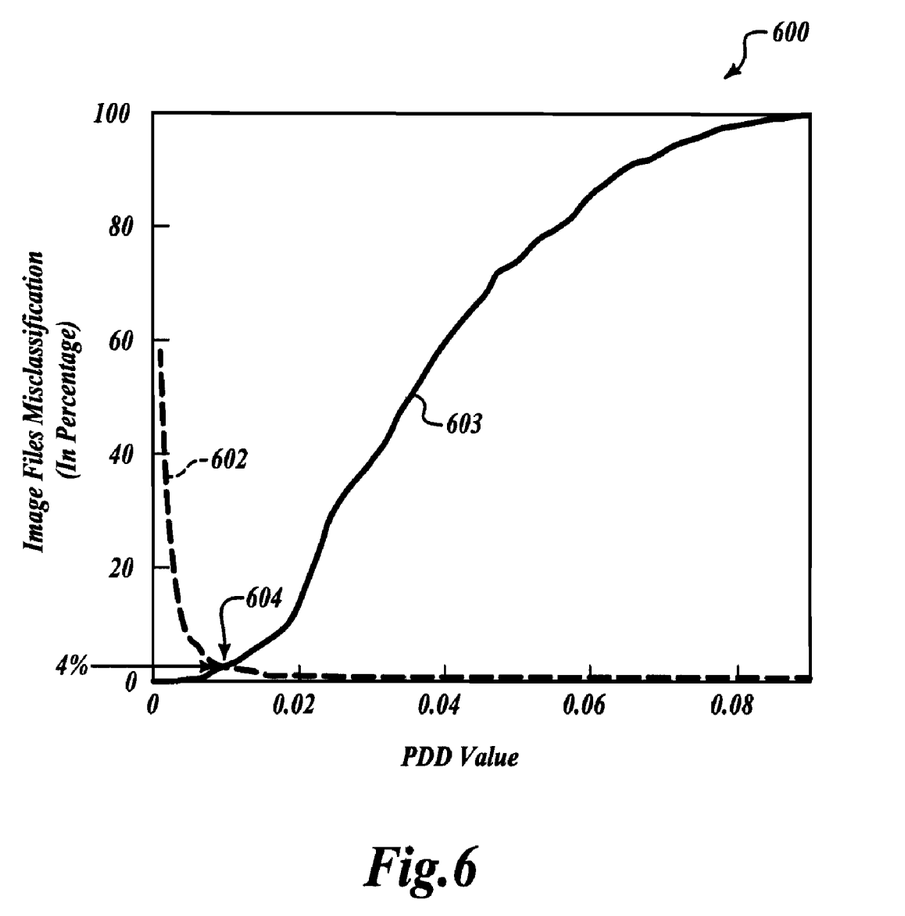
FIG. 6 illustrates one embodiment of a statistical histogram useable in determining a type I (false positive) threshold value for detecting image spam.

For example, FIG. 6 illustrates one embodiment of a statistical histogram useable in determining a type I (false positive) threshold value for detecting image spam. As shown in the figure the x-axis represents PDD values, and the y-axis represents a cumulative number of images. Moreover, line 602 of FIG. 6 represents image spam, while line 603 represents non-spam images. The intersection 604 may then be used to statistically determine whether a PDD for the image is image spam. For example, in FIG. 6, the intersection at a PDD value of about 0.009, which indicates if the normalized PDD for the image, as determined above, is above 0.009, then the image may be determined to be spam, while at or below intersection 604, the image is unlikely to be image spam, based on about a 4% false positive (type I) errors (e.g., as measured at the y-intersection). Thus, intersection 604 represents a statistical threshold value for which to determine whether an image is image spam, with a 4% false positive result. Clearly, as image characteristics change, and/or a desire for lower false positives are sought, lines 602-603 may change, as might intersection 604. Thus, FIG. 6 is not intended to limit the invention in any manner, and is instead directed merely to provide one illustrative example.

Moreover, in one embodiment, PDDs may be obtained for different characteristics of the image. Each PDD may then be examined separately or in combination with another PDD to statistically determine whether the image is likely to be image spam.

Moreover, reduction of false positives may also be achieved by setting filters on different attributes of the image. For example, as noted above, a range of file sizes, dimensions, or the like, might be narrowed, or otherwise adjusted to minimize examination of unlikely candidate images. Moreover, for different type file types, differing thresholds may be used.

In any event, processing flows next to decision 518, where a determination is made whether the image is statistically determined to be image spam. If so, processing flows to block 522; otherwise, processing continues to block 520.

At block 520, the image is determined to be non-image spam. Thus, the message, including the image may be forwarded to its destination. Processing then returns to a calling process to perform other actions.

At block 522, however, the image is determined to be image spam. As such, any of a variety of preventative actions may be performed, including, but not limited to deleting the message, such that it may not be sent to its destination, expunging the message of the determined image spam but allowing the message to be forwarded, or the like. In addition, an alert, or the like, may also be sent to an administrator, destination, law enforcement agency, or the like. In any event, processing then returns to a calling process to perform other actions.

ILLUSTRATIVE EXAMPLES

Figure 7A:
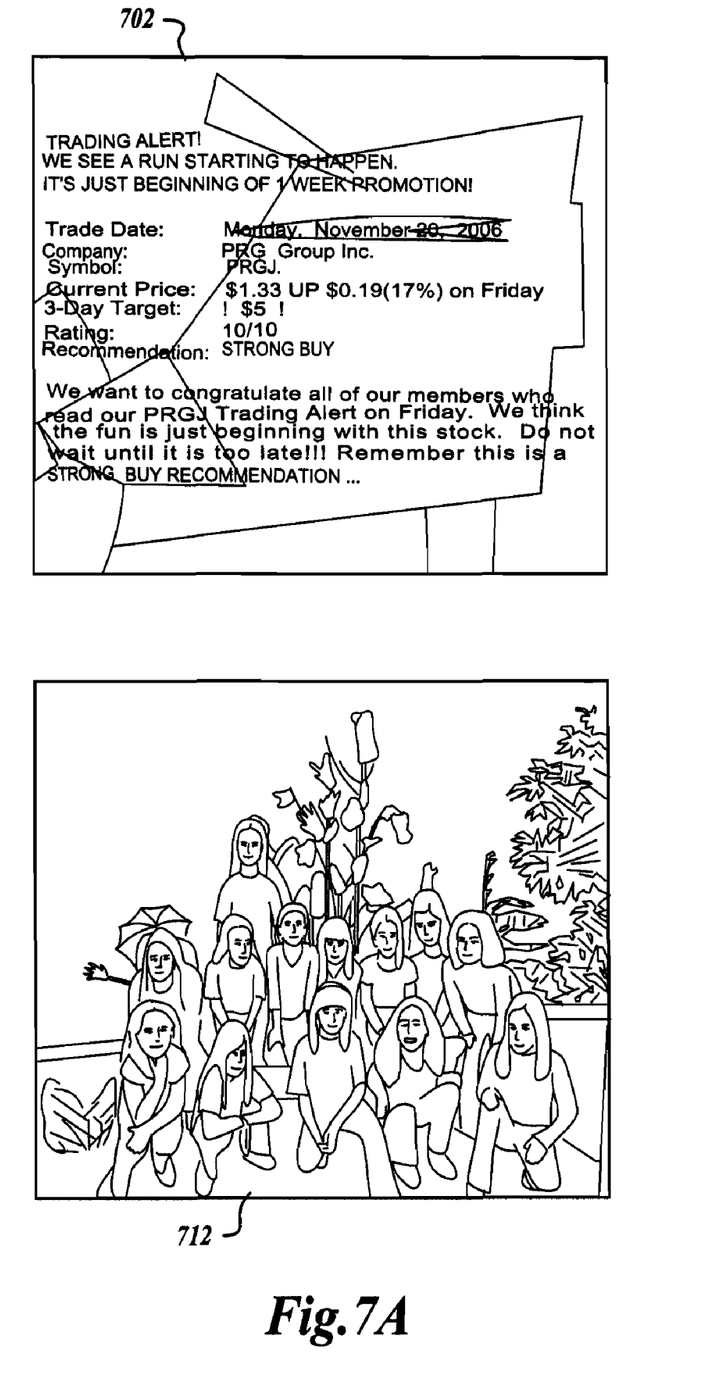
FIGS. 7A-7C show two example image conversions useable for illustrating image spam detection, in accordance with the invention.
Figure 7B:
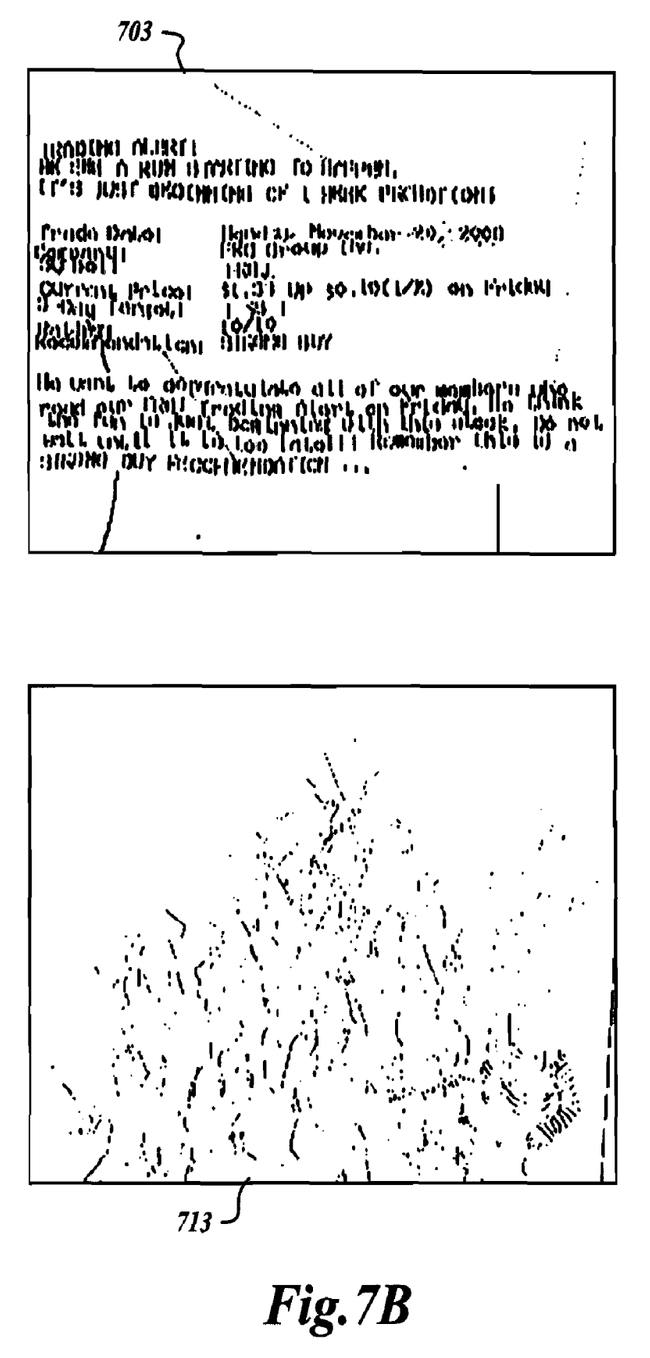
Figure 7C:
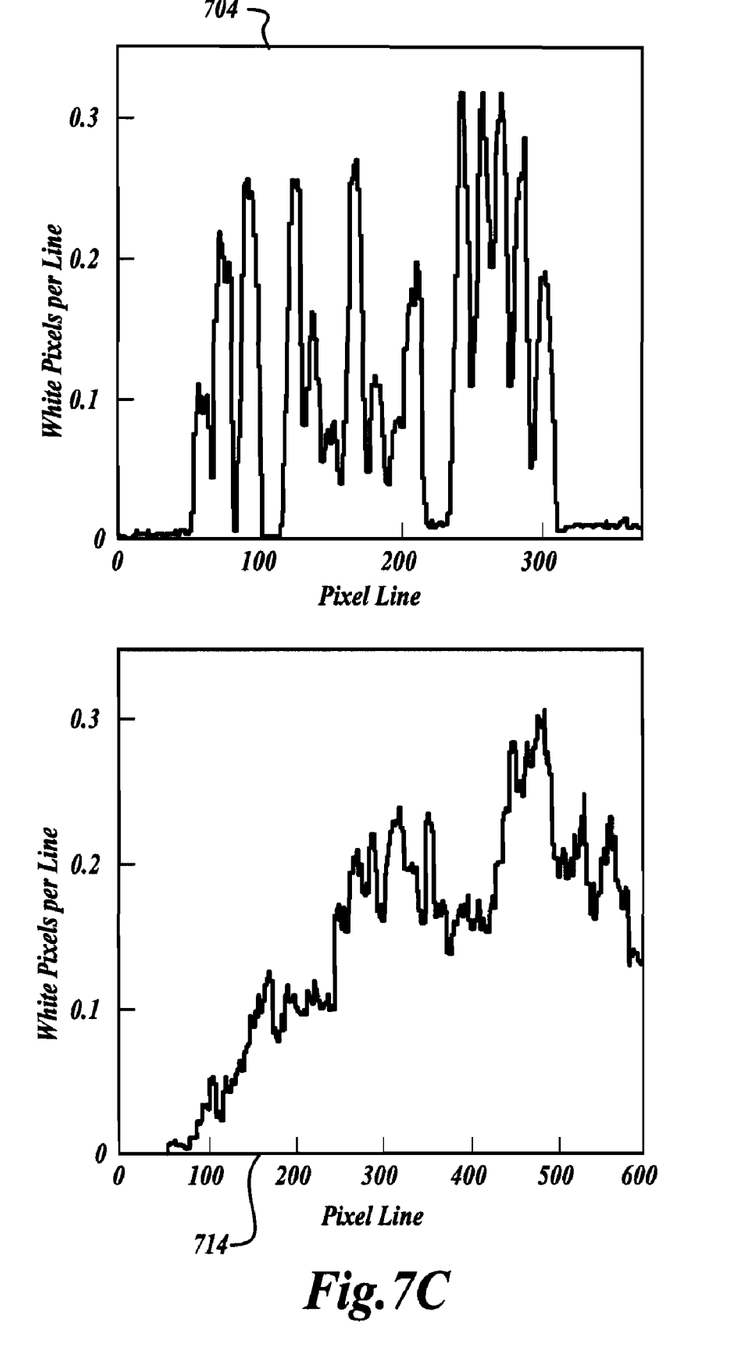

FIGS. 7A-7C show two example image conversions useable for illustrating image spam detection, in accordance with the invention. Illustrations 702-704 show one example of image spam 702. Illustration 703 illustrates one embodiment of a possible resulting image based on performing grayscaling, edge detection, and thresholding on the image spam 702. Illustration 703 shows one possible embodiment of a resulting pixel histogram of aggregate white pixels per each horizontal line. In this example, the resulting normalized PDD was determined to be 0.014, indicating within a 4% false positive error rate, that the image is image spam.

Illustrations 712-714 shows one example of non-image spam 712, and its respective processing results. As seen, illustration 713 shows one embodiment of a possible resulting image based on performing grayscaling, edge detection and thresholding on the non-image spam 712. Similarly, illustration 713 shows one possible embodiment of a resulting pixel histogram of aggregate white pixels per each horizontal line. In this example, the resulting normalized PDD was determined to be 0.008, indicating within a 4% false positive error rate, that the image is non-image spam.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing delivery of content over a network, comprising:
    receiving a message, wherein the message includes an image file; extracting the image file from the message;
    converting the image file to a grayscale image;
    performing pixel edge detection within the grayscale image that includes at least eliminating weak edges by converting a pixel to black if its threshold chrominance is below a defined threshold, and eliminating weak edges by converting a contrast of a pixel within a determined weak edge to a higher contrast;
    determining a pixel density distribution (PDD) for the edge detected image; if the PDD statistically indicates that the image file is an image spam file, performing an action to inhibit at least the image file from being forwarded to a destination associated with the message; and
    if the PDD statistically indicates that the image file is not image spam, forwarding the message with the image file towards a destination such that the image file is viewable by a recipient at a display;
    collecting feedback based, in part, on a number of false-positives for the statistical indications; and
    employing the feedback to modify a PDD statistical threshold useable in indicating if the image file is an image spam file.

2. The method of claim 1, the method further comprising:
    determining at least one physical characteristic associated with the extracted image file, including at least one of a file type, file size, or file dimension; and
    if the at least one physical characteristic statistically indicates that the image file is unlikely to be image spam, then forwarding the message with the image file towards the destination such that the image file is viewable by the recipient at the display.

3. The method of claim 1, wherein performing pixel edge detection further comprises:
    employing a Sobel operator to detect the edges within the image.

4. The method of claim 1, wherein determining the PDD further comprises:
    for each horizontal line within the image, determining a number of edge pixels; and
    determining the PDD based on the number of edge pixels for each line.

5. The method of claim 1, wherein if the PDD statistically indicates further comprises:
    determining a statistical threshold value for which to indicate the image file is an image spam file based at least in part on an acceptable false-positive result.

6. The method of claim 1, wherein if the PDD statistically indicates that the image file is, further comprises:
    determining at least one physical characteristic of the image file; and
    employing the at least one physical characteristic to determine a statistical threshold value;
    comparing the resulting PDD for the image file to the statistical threshold value;
    if the PDD is above the statistical threshold value, identifying the image file as statistically likely to be image spam; and
    if the PDD is at or below the statistical threshold value, identifying the image file as statistically likely to not be image spam.

7. A network device for selectively managing delivery of messages over a network, comprising:
    a transceiver to send and receive data over the network; and
    a processor that is operative to perform actions, including:
        receiving an image file associated with a message;
        determining at least one physical characteristic of the image file; and if the physical characteristic indicates that statistically, the image file is unlikely to be associated with image spam, enabling the image file and message to be forwarded to a destination, otherwise performing the following actions, comprising:
    converting the image file to a grayscale image;
    performing pixel edge detection within the grayscale image and eliminating weak edges by converting a pixel to black if its threshold chrominance is below a defined threshold, and eliminating weak edges by converting a contrast of a pixel within a determined weak edge to a higher contrast;
    determining a pixel density distribution (PDD) for the edge detected image;
    if the PDD statistically indicates that the image file is an image spam file, performing an action to inhibit at least the image file from being forwarded to a destination associated with the message; and
    if the PDD statistically indicates that the image file is not image spam, forwarding the message with the image file towards the destination such that the image file is viewable by a recipient at a display;
collecting feedback based, in part, on a number of false-positives for the statistical indications; and
employing the feedback to modify a PDD statistical threshold useable in indicating if the image file is an image spam file.

8. The network device of claim 7, wherein the physical characteristic comprises at least one of the following: a dimension, a file type, a file size, or a compression ratio.

9. The network device of claim 7, wherein if the PDD statistically indicates that the image file is, further comprises, using at least in part, the at least one physical characteristic to determine a statistical threshold value useable to compare the PDD to, to determine statistically a likelihood that the image file is or is not image spam.

10. The network device of claim 7, wherein the processor is operative to perform actions, further comprising:
receiving feedback that the image file is incorrectly identified as image spam or incorrectly identified as non-image spam;
determining a digital signature for the incorrectly identified image file; and
if another image file is received that matches the digital signature, processing the image file based on a corrected identity according to the received feedback.

11. The network device of claim 7, wherein performing pixel edge detection further comprises employing a Sobel operator to detect the edges within the image.

12. The network device of claim 7, wherein if the PDD statistically indicates that the image file is an image spam file, further comprises: determining if the image file is statistically likely to be an image spam file based on a statistically significant amount of detected text within the image file.

13. The network device of claim 7, wherein if the physical characteristic indicates that statistically, further comprises:
using feedback about whether the image file is correctly or incorrectly identified as image spam to modify at least one of a physical characteristic used in determining if the physical characteristic indicates that statistically the image file is unlikely to be associated with image spam.

14. A system for use in selectively enabling delivery of content over a network, comprising:
a message server that is configured and arranged to perform actions, including: receiving a message; and
if the message includes an image file, providing the image file to an image spam detection component; and
the image spam detection component being configured to perform actions, including:
converting the image file to a grayscale image;
performing pixel edge detection within the grayscale image and eliminating weak edges by converting a pixel to black if its threshold chrominance is below a defined threshold, and eliminating weak edges by converting a contrast of a pixel within a determined weak edge to a higher contrast;
determining a pixel density distribution (PDD) for the edge detected image;
if the PDD statistically indicates that the image file is an image spam file, providing an alert to the message server such that the image file is prevented from being forwarded to a destination associated with the message; and
if the PDD statistically indicates that the image file is not image spam, providing an indicator to the message server such that the image file is forwarded towards the destination such that the image file is viewable by at the destination;
collecting feedback based, in part, on a number of false-positives for the statistical indications; and
employing the feedback to modify a PDD statistical threshold useable in indicating if the image file is an image spam file.

15. The system of claim 14, wherein performing pixel edge detection further comprises employing a Sobel operator to detect the edges within the image file.

16. The system of claim 14, wherein the image spam detection component is configured to perform actions, further including:
determining at least one physical characteristic associated with the image file; and
if the at least one physical characteristic statistically indicates that the image file is unlikely to be image spam, then forwarding the message with the image file towards the destination such that the image file is viewable by the recipient at the display.

17. The system of claim 14, wherein the image spam detection component is configured to perform actions, further including:
determining at least one physical characteristic associated with the image file; and
using the physical characteristic to determine, in part, a threshold value useable in statistically indicating if the image file is an image spam based on the determined PDD for the image file.

18. The system of claim 17, wherein at least one physical characteristic comprises at least one of a file size, a file type, or a file dimension.

19. The system of claim 14, wherein the image spam detection component is configured to perform actions, further including:
receiving feedback that the image file is incorrectly identified as image spam or incorrectly identified as non-image spam;
determining a digital signature for the incorrectly identified image file; and
if another image file is received that matches the digital signature, processing the image file based on a corrected identity according to the received feedback.

* * * * *